United States Patent [19]

Baravian et al.

[11] Patent Number: 5,616,395
[45] Date of Patent: Apr. 1, 1997

[54] PROCESS FOR THE PRODUCTION OF TWO-LAYER TEXTILE REINFORCEMENT ADAPTED FOR THE PRODUCTION OF BITUMINOUS SEALING SHEETS FOR ROOFING AND REINFORCEMENT THUS OBTAINED

[75] Inventors: Jean Baravian, Sundhoffen; Ulrich Jahn, Labaroche; Robert Groten, Sundhoffen; Jean-Jacques Beck, Colmar, all of France

[73] Assignee: Freudenberg Spunweb S.A., Colmar, France

[21] Appl. No.: 386,081

[22] Filed: Feb. 9, 1995

[30] Foreign Application Priority Data

Feb. 10, 1994 [FR] France ............... 94 01671

[51] Int. Cl.⁶ .................. B32B 5/06; B32B 5/26; D06N 5/00; E04D 5/02
[52] U.S. Cl. .................. 428/102; 442/26; 28/104; 28/112; 28/169; 156/91; 156/148; 156/176; 156/291; 156/324; 428/103; 428/109; 428/110; 428/141; 428/340; 428/341; 428/489
[58] Field of Search .................. 28/104, 112, 169; 156/91, 148, 176, 291, 324; 428/235, 247, 251, 253, 285, 489, 102, 103, 109, 110, 340, 341, 300, 302

[56] References Cited

U.S. PATENT DOCUMENTS

| 4,491,617 | 1/1985 | O'Connor et al. | 428/236 |
| 4,539,254 | 9/1985 | O'Connor et al. | 428/236 |
| 4,755,423 | 7/1988 | Greiser | 428/284 |
| 4,762,744 | 8/1988 | Woiceshyn et al. | 428/219 |
| 4,780,350 | 10/1988 | O'Connor et al. | 428/109 |
| 4,987,027 | 1/1991 | Zerfass | 428/489 |

FOREIGN PATENT DOCUMENTS

| 0110039 | 6/1984 | European Pat. Off. . |
| 0176847 | 4/1986 | European Pat. Off. . |
| 0185169 | 6/1986 | European Pat. Off. . |
| 0208918 | 1/1987 | European Pat. Off. . |
| 0315553 | 5/1989 | European Pat. Off. . |
| 0435001 | 7/1991 | European Pat. Off. . |

OTHER PUBLICATIONS

Ming-Hsiung Yen et al., Chapter II Nonwovens, Tai-Yih Enterprise Management Consultant Ltd., Nov. 1983.

*Primary Examiner*—James C. Cannon
*Attorney, Agent, or Firm*—Young & Thompson

[57] ABSTRACT

A process for the production of a two-layer textile reinforcement for the production of bituminous sealing sheets for roofing consists first, from a first layer based on nonwoven cloth, in consolidating this nonwoven cloth by mechanical or hydraulic bonding and in thermostabilizing it. This first consolidated and thermostabilized layer is then assembled with a second mineral fiber layer, either by counter-gluing, or by needling, or by seam knitting. These two latter assembly methods are used only when the second mineral fiber layer is in the form of a grid or cloth of continuous or discontinuous mineral filaments. The first assembly method by counter-gluing is itself used no matter what the structure of the second mineral filament layer, whether it be in the form of a grid or a cloth of continuous or discontinuous mineral fibers or in the form of a scrim of mineral fibers.

16 Claims, 1 Drawing Sheet

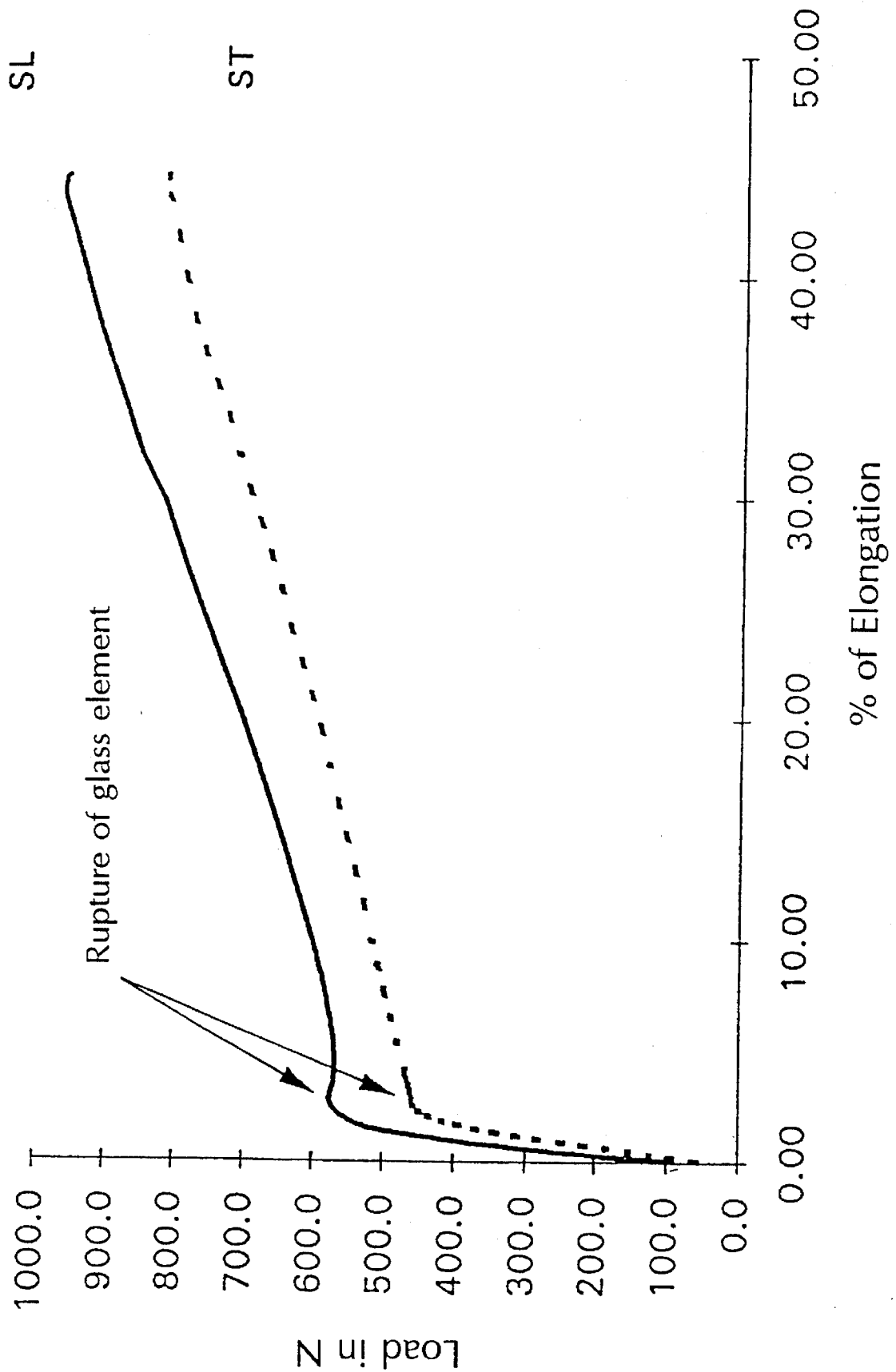

PROCESS FOR THE PRODUCTION OF TWO-LAYER TEXTILE REINFORCEMENT ADAPTED FOR THE PRODUCTION OF BITUMINOUS SEALING SHEETS FOR ROOFING AND REINFORCEMENT THUS OBTAINED

DESCRIPTION

FIELD OF THE INVENTION

The present invention relates to the field of textile reinforcement for bituminous sealing sheets, and has for its object a process for the production of such a two layer textile reinforcement, as well as the reinforcement thus obtained.

BACKGROUND OF THE INVENTION

At present, these reinforcements are frequently constituted by an unwoven material coated and impregnated with bitumens modified with polymers.

This polyester reinforcement tends to replace more and more the nonwoven reinforcement constituted of glass fibers for reasons of superior resistance to puncturing and cracking, in combination with better mechanical characteristics as to rupture and elasticity.

However, this nonwoven polyester reinforcement is less dimensionably stable than nonwoven reinforcement constituted of glass fibers, which often requires their stabilization by combination with a mineral structure, such as a network of glass fibers, in the form of a grid or parallel filaments, principally to avoid deformation of these reinforcements during the application of bitumen, and eventually of the sealing sheet disposed on the roofing.

But at present, one of the most serious problems connected with such reinforcement is their flammability.

Thus, in the case of fire, it is first of all necessary to control the spread of the fire so as to avoid other immediately adjacent buildings catching fire.

But when burning material falls on the roofing sheet, even when covered with gravel or slate, the latter may catch on fire, principally because of the bituminous binder, but also because of the presence of synthetic fibers such as polyester.

This problem moreover becomes more and more serious because of the development of said reinforcement, the latter having the tendency always to contain more synthetic fibers relative to the mineral fibers. Similarly, the development of bituminous compositions renders them more flammable.

Strict rules and regulations have been enacted for several years so as to reduce the danger of the spread of fire by roofing in the case of burning buildings.

The solutions presently employed to date in sealing systems, to obtain an appropriate classification according to the rules and regulations in force against the danger of burning roofs, consist in the use of a sealing sheet, reinforced by a glass cloth, disposed in surface securement to a membrane modified bitumen reinforced with nonwoven polyester.

Other solutions to decrease the flammability of the bituminous sealing sheets have been proposed, such as for example, the addition of a fire suppressing agent in the bitumen, such as aluminum hydrate, or else the use of polyester of the type known as "flame retardant".

But these solutions are not satisfactory, because while increasing the cost of production, they do not prevent the spread of fire. Nonflammable polyester, for example, will not burn with the building, but will melt and thus contribute in spite of everything to the propagation of the fire.

One therefore seeks to create a veritable screen in the reinforcement, whose specific function is to avoid the propagation of the fire in a vertical direction and in a planar fashion.

Two types of solutions principally exist: a three-layer reinforcement, or a two-layer reinforcement.

The first type of solution, namely, the three-layer reinforcement, is not completely satisfactory, because the layer forming the anti-fire screen being always disposed between the two other layers forming the reinforcement, the layer comprising synthetic fibers, for example nonwoven polyester, will always be disposed on the surface, which arrangement is exactly to be avoided.

The second type of solution, namely, the two-layer reinforcement, has itself difficulties of production. Thus, a two-layer reinforcement must have good thermal stability, a very low shrinkage force as well as a small dimensional shrinkage, which is to say good dimensional stability.

But all the two-layer reinforcements now in existence, have either poor adhesion to the layer forming the screen on the other layer, or a low speed of impregnation during application of bitumen, or again the phenomenon of curling, particularly also during application of bitumen.

Moreover, the search for very high thermal stability often leads to unacceptably increased rigidity of the layer forming the screen, which gives rise to difficulties during handling by rolling the reinforcement.

The problem addressed by the invention therefore consists in providing a two-layer textile reinforcement adapted for the production of bituminous sealing sheets for roofing having such a fire retardant screening layer, without at the same time the presence and properties of such a layer giving rise to the various drawbacks described above.

SUMMARY OF THE INVENTION

This problem is solved according to the process which is the object of the present invention, which consists firstly, starting with a first base layer of a nonwoven sheet, in consolidating this nonwoven sheet by mechanical or hydraulic bonding and heat stabilizing it, then in assembling this first consolidated and thermo-stabilized layer with a second layer of mineral fiber, either by counter-gluing or needling, or by stitch-knitting, these latter two assembly techniques being used only when the second mineral fiber layer is in the form of a grid or cloth of mineral fibers which are continuous or discontinuous, the first manner of assembly by counter-gluing being itself used no matter what the structure of the second mineral fiber layer, whether in the form of a grid or a cloth of continuous or discontinuous mineral fibers or in the form of a scrim of mineral fibers.

DETAILED DESCRIPTION OF THE INVENTION

The consolidation of the first layer with a base of nonwoven sheet is effected before the thermo stabilization, according to one preferred characteristic of the invention, or by needling, or by water jet.

The thermal stabilization of the first layer with an unwoven sheet base is effected at a temperature comprised between 180° C. and 240° C., preferably 200° C. to 220° C., for a period of five to sixty seconds, preferably 8 to 20 seconds.

The apparent density after thermal stabilization is comprised between 0.1 and 0.5, preferably between 0.15 and 0.3.

The thermal stabilization is effected for example by calendaring or by a drum with air passing through, with or without a calibrating system.

In the case of an assembly of two layers by counter-gluing, the glue used is a thermosetting or thermoplastic polymer, with or without a cross-linking agent, such as polyester, copolyester, polyamide, copolyamide, polyurethane, EVA (ethylene vinyl acetate) or a mixture, so as to obtain an adhesion of the two layers to the reinforcement at least up to 200° C.

Of course, the assembly methods of the two layers by a fusion of one part of one of the components is not an integral part of the invention, because cementing by binder fibers in one of the two layers does not give a satisfactory result in the finished product ready to use.

According to another characteristic of the invention, the glue used is preferably a cross-linked polyurethane, copolyester or EVA whose melting point is comprised between 160° C. and 220° C., more particularly between 190° C. and 200° C. The quantity of glue used is comprised between 5 and 40 g/m$^2$, preferably between 8 and 30 g/m$^2$. It can be in the form of powder, filaments, films, fibers, continuous or discontinuous, of the mentioned polymers in the form of a solution, aqueous dispersion or hot melt. The coating is effected continuously or preferably discontinuously, so as to maintain a high porosity and, as a result, a very high speed of bitumination.

After coating, the assembly is effected in turning and heating machines operating by heat transfer, for example with a calendar of the Stork type, Lemaire type, Schaetti type, or with a drum with air passing through with or without a calibrating system.

The assembly itself is effected at a temperature comprised between 180° C. and 250° C., preferably between 190° C. and 225° C., at low pressure generally less than 20 daN/cm$^2$, preferably comprised between 2 daN/cm$^2$ and 10 daN/cm$^2$, for a dwell time comprised between 5 seconds and 60 seconds, preferably between 10 seconds and 30 seconds.

It is preferable to use an infrared panel to pre-dry and partially fuse the glue in the case of the use of a calendar.

The present invention also has for its object a two-layer textile reinforcement adapted for the production of bituminous sealing sheets for roofing obtained by the use of the process according to the invention, which reinforcement is characterized in that the first layer is based on a nonwoven sheet obtained by a dry process, a wet process or by extrusion of a molten mass in the form of filaments, preferably a homogenous sheet of continuous filaments of thermoplastic synthetic polymer, having no binder fibers, such as polyester, copolyester, polyamide, copolyamide or polyurethane, and the second filamentary mineral layer is in the form either of a grid or of a cloth of continuous or discontinuous mineral fibers, or a scrim of mineral fibers.

The nonwoven sheet forming the first layer is preferably a homogenous sheet of continuous filaments of ethyleneglycol polyterephthalate formed by direct casting. The titer of the filaments of the sheet forming the first layer and which can be of any cross section at all, flat, round or profiled, is comprised between 2 and 15 dtex, preferably between 4 and 8 dtex, the weight of this first layer being comprised between 50 g/m$^2$ and 300 g/m$^2$, preferably between 80 g/m$^2$ and 200 g/m$^2$.

The second layer is preferably in the form of a scrim of mineral fibers formed wet or dry, more particularly discontinuous glass fibers with chemical or thermal bonding, the weight of this second layer being comprised between 10 g/m$^2$ and 100 g/m$^2$, preferably between 40 g/m$^2$ and 60 g/m$^2$.

There is thus obtained a two-layer textile reinforcement according to the invention, whose principal property of the first layer is to confer the required mechanical and physical characteristics in the use of sealing sheets to form the framework or even the reinforcement of the framework, and in which the principal property of the second layer is create a fire barrier.

The hot shrinkage and force of shrinkage at a temperature of 200° C. of the first layer must of necessity remain very low (which is to say less than 2%) so that the reinforcement will be preferably flat after lamination and will undergo no curling.

The second layer forming the anti-fire screen is a layer of unidirectional or multidirectional mineral filaments which can be comprised either of continuous mineral filaments, so connected to the unwoven structure that the latter can keep its properties of elongation or deformation upon rupture. There will preferably be used a nonwoven structure formed wet or dry, more particularly discontinuous glass fibers with binder, so as to obtain a high dimensional stability under all conditions of manufacture, ultimate treatment and use.

This layer, in addition to its retardation function, must guarantee the mechanical dimensional stability of the reinforcement during application of bitumen and of the sheet applied on the roofing.

The fire resistant function of this second layer must satisfy in particular standards DIN 4102 of the Nordtest NT Fire 006 and of the French regulation (decree of Sep. 10, 1970, revised in 1988) relating to the classification of coverings of combustible materials relative to the dangers of fire resulting from an external fire—Official Journal of Sep. 29, 1970).

The two examples which follow illustrate nicely the invention.

EXAMPLE 1

The first layer is comprised by an unwoven sheet, obtained from a mass cast in the form of filaments, of polyethyleneterephthalate of a titer of 6 dtex having a weight of 160 g/m$^2$, and consolidated by mechanical needling with a needler of the type Asselin double stroke DF 41-44-16.

The needle used is of the type Singer 15×18×40×3 RB22.

The depth of penetration is 9 mm over one surface and 13.5 mm over the other surface.

The number of perforations is 200/cm$^2$.

The needle density is about 20,000 needles/m.

The product is calendared, with a pressure of 28 daN/cm, between two metallic rollers heated to a temperature of 210° to 215° C., to achieve the desired shrinkage and density by passage in an S path with a contact time of about 20 seconds.

In a second phase, 25 g/m$^2$ of glue paste trademarked Vinamul 3231 (aqueous dispersion of a copolymer of ethylene vinyl acetate made by the company Vinamul) with a cross-linking agent added thereto trademarked Dispercoll KA 8481 (dispersion of polyurethane made by the Bayer Company) in a proportion of 10% are applied by serigraphy to the surface of this first layer.

After preheating in an infrared oven, the assembly with a scrim of glass Microlith DH60 made by the Schuller Company is provided by calendaring at a temperature of 200° C.

and a passage in an S curve. The contact time is about 15 seconds.

The counter-glued complex is then impregnated along a Nardini-type line at a speed of 14 m/min with oxidized bitumen at a temperature of 175° C. The surfacing bitumen is a bitumen modified with an SBS (elastomeric styrene butadiene styrene) (13% by weight), the temperature being 170° C.

The sheet obtained is slated, the thickness being 5.5 mm and the approximate weight 5500 g/m$^2$.

After application of bitumen, the sheet meets the standard Nordtest NT Fire 006.

The following table sets forth the mechanical characteristics obtained and the single figure shows the curve of load at rupture illustrating a complete homogeneity as to the phenomenon of rupture. The value of the dimensional stability does not exceed in any case the limit of 0.2% by the dimensional stability test of the UEATC.

| | | | | Reinforcement | Sheet |
|---|---|---|---|---|---|
| Surface mass | | | (g/m$^2$) | 250 | 5539 |
| Thickness | NFG38012 | | (mm) | 0.99 | 5.12 |
| Load at rupture | NFG07001 | SL | (daN) | 58.0 | 96.7 |
| Load at rupture | NFG07001 | ST | (daN) | 56.0 | 81.8 |
| Isotrophy | | | | 1.1 | 1.2 |
| Elongation | NFG07001 | SL | (%) | 56.0 | 44 |
| Elongation | MFG07001 | ST | (%) | 62.0 | 44 |
| Load 3% | | SL | (daN) | 17.0 | 57.4 |
| Load 3% | | ST | (daN) | 16.0 | 45.9 |
| Load 5% | | SL | (daN) | 16.0 | 56.7 |
| Load 5% | | ST | (daN) | 15.0 | 47.6 |
| Load 15% | | SL | (daN) | 21.0 | 64.8 |
| Load 15% | | ST | (daN) | 18.0 | 55.3 |
| Rupture energy | NFG07001 | SL | (J) | 39.0 | 63.6 |
| Rupture energy | NFG07001 | ST | (J) | 40.0 | 54.4 |
| Tearing triggered | NFG07146 | SL | (daN) | | 7.7 |
| Tearing triggered | NFG07146 | ST | (daN) | | 9.2 |
| Dimensional stability | | SL | (%) | | −0.14 |
| Dimensional stability | | ST | (%) | | −0/07 |

EXAMPLE 2

The first layer is prepared in the same way as in Example 1.

In a second phase, a quantity of 10 g/m$^2$ polyurethane reactive hot melt is pulverized on the surface of the sheet of polyester.

The assembly of the two layers is effected immediately after the pulverization unit, with a system of calibration at ambient temperature and low pressure of about 5 daN/cm by means of two metallic rollers.

The speed of the machine is adjusted to 5 m/min.

The mechanical characteristics obtained for these complexes are given in the following table:

| Surface mass | | | (g/m$^2$) | 228 |
|---|---|---|---|---|
| Thickness | NFG38012 | | (mm) | 0.86 |
| Load at rupture/5 cm | NFG07001 | SL | (daN) | 56 |
| | | ST | (daN) | 52 |
| Isotropy | | | | 1.08 |
| Elongation at rupture | NFG07001 | SL | (%) | 56 |
| | | ST | (%) | 64 |
| Load 3% | | SL | (daN) | 27 |
| | | ST | (daN) | 16 |

-continued

| Load 5% | | SL | (daN) | 25 |
|---|---|---|---|---|
| | | ST | (daN) | 16 |
| Load 15% | | SL | (daN) | 25 |
| | | ST | (daN) | 18 |
| Rupture energy | NFG07001 | SL | (J) | 41 |
| | | ST | (J) | 39 |
| Glass rupture | NFG07001 | SL | (daN) | 45 |
| | | ST | (daN) | 19 |
| | | SL | (%) | 1.7 |
| | | ST | (%) | 1.5 |

The two-layer materials, produced according to the two examples described above, are therefore characterized by an excellent flatness, with no curling, including during and after the application of bitumen.

No ungluing effect is produced during the transformation of the reinforcement into a bitumen coated sheet nor after aging.

The reinforcement thus has an excellent dimensional stability during impregnation and coating with the hot bitumen in the transformation phase. Similarly, for the test of dimensional stability of the sheet, the results are excellent. The curve of load-elongation-rupture of the sealing sheet shown in the drawing shows a high loading at rupture, with an elongation at rupture greater than 40%.

The rupture of the glass element is perfectly integrated into the rupture curve of the unwoven polyester constituent, this being the test of excellent mechanical operation during aging of the sealing on the roof, even in the case of cyclical movements of the supports or thermal insulating panels.

As the two examples above illustrate, the two-layer textile reinforcement according to the invention thus has an excellent thermal stability while remaining flat under all circumstances, having no curling, while being easily impregnated and presenting a gluing plane which is very permeable.

Similarly, the reinforcement has excellent mechanical and physical properties, namely excellent dimensional stability, which is to say a very low shrinkage force as well as dimensional shrinkage, very great flexibility, very good resistance to tearing, excellent elongation at rupture, very good resistance to puncturing and above all a synergy of the resistance to rupture with the bitumen.

The sheet thus obtained has a very good aptitude to be handled during installation on the roof, because it is neither too rigid nor too flexible.

The consolidation and thermostabilization take place only in the first layer and before assembly with the second layer and all binder fibers being absent from the first layer, and hence all thermobinding being absent, the reinforcement according to the invention has no significant shrinkage force.

Of course, the invention is not limited to the embodiment described and shown in the accompanying drawing. Modifications remain possible, particularly as to the construction of the various elements, or by substitution of technical equivalents, .without thereby departing from the scope of protection of the invention.

We claim:

1. A two-layer composite sheet having utility as a reinforcement for bituminous roofing comprising:

a first nonwoven base sheet layer which has been mechanically or hydraulically consolidated, heat-set and, through the agency of an applied adhesive and not through fusion of a component fiber of the nonwoven base sheet, adhered to a second layer selected from the group consisting of a scrim, grid, and cloth of mineral fibers, providing that when the second layer is in the form of a grid or cloth, the consolidated and heat set nonwoven base sheet is also needle-bonded or stitch-knitted to the second layer.

2. Two-layer composite sheet according to claim 1, wherein the nonwoven base sheet forming the first layer is a homogeneous cloth of continuous filaments of ethyleneglycol polyterephthalate produced by direct casting.

3. Two-layer composite sheet according to claim 1, wherein the titer of the filaments of the nonwoven based sheet forming the first layer ranges between 2 and 15 dtex, and the weight of said first layer ranges between 50 g/m$^2$ and 300 g/m$^2$.

4. Two-layer composite sheet according to claim 3, wherein the titer of the filaments of the nonwoven base sheet forming the first layer ranges between 4 and 8 dtex, and the weight of said first layer ranges between 80 g/m$^2$ and 200 g/m$^2$.

5. Two-layer composite sheet according to claim 1, wherein the second mineral fiber layer is in the form of a scrim of discontinuous glass fibers with chemical or thermal bonding.

6. Two-layer composite sheet according to claim 1, wherein the weight of the second mineral fiber layer ranges between 10 g/m$^2$ and 100 g/m$^2$.

7. A process of making a two-layer composite sheet having utility as a reinforcement for bituminous roofing comprising:
mechanically or hydraulically consolidating and heat setting a first nonwoven base sheet layer and, through the agency of an applied adhesive and not through fusion of a component fiber of the nonwoven base sheet,
adhering the consolidated and heat set nonwoven base sheet to a second layer selected from the group consisting of a scrim, grid, and cloth of mineral fibers, with the proviso that when the second layer is in the form of a grid or cloth, the consolidated and heat set nonwoven base sheet is also bonded to the second layer through use of an additional step involving needle-bonding or stitch-knitting.

8. Process according to claim 7, wherein the consolidation of the first layer is effected before the heat setting.

9. Process according to claim 7, wherein the consolidation of the first layer is effected by needling or by water jets.

10. Process according to claim 7, wherein the heat setting of the first layer is effected at a temperature ranging between 180° C. and 240° C. for a period of 5 seconds to 60 seconds.

11. Process according to claim 10, wherein the heat setting of the first layer is effected at a temperature ranging between 200° C. and 220° C. for a period of 8 seconds to 20 seconds.

12. Process according to claim 7, wherein the adhesive used to adhere the consolidated and heat set nonwoven base sheet to the second layer is a thermosetting or thermoplastic polymer, with or without a crosslinking agent, said polymer being selected from the group consisting of polyester, copolyester, polyamide, copolyamide, polyurethane, EVA and mixtures thereof.

13. Process according to claim 12, wherein the adhesive used is a polyurethane, copolyester or crosslinked EVA whose melting point ranges between 160° C. and 220° C.

14. Process according to claim 12, wherein the quantity of adhesive used is between 5 and 40 g/m$^2$.

15. Process according to claim 12, wherein the adhering is effected at a temperature between 180° C. and 250° C. at a pressure lower than 20 daN/cm$^2$ for a dwell time ranging between 5 seconds and 60 seconds.

16. Process according to claim 15, wherein the adhering is effected at a temperature between 190° C. and 225° C. at a pressure ranging between 2 daN/cm$^2$ and 10 daN/cm$^2$ for a dwell time ranging between 10 seconds and 30 seconds.

* * * * *